(12) United States Patent
Shigehara et al.

(10) Patent No.: US 6,952,511 B2
(45) Date of Patent: Oct. 4, 2005

(54) GAIN EQUALIZER AND OPTICAL AMPLIFICATION APPARATUS

(75) Inventors: Masakazu Shigehara, Yokohama (JP); Masaki Ohmura, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 10/665,357

(22) Filed: Sep. 22, 2003

(65) Prior Publication Data

US 2004/0109638 A1 Jun. 10, 2004

(30) Foreign Application Priority Data

Sep. 20, 2002 (JP) .................................... P2002-276032

(51) Int. Cl.[7] ........................... G02B 6/34; H04B 10/12; H04J 14/02
(52) U.S. Cl. ............................. 385/37; 385/14; 385/10; 385/27; 359/341.1; 398/82; 398/84; 398/149; 398/160
(58) Field of Search ....................... 385/31, 37, 27, 385/14, 10, 42, 24; 398/79, 82, 87, 84, 149, 160; 359/333, 337.1, 337.21, 341.1

(56) References Cited

U.S. PATENT DOCUMENTS

| | | | | |
|---|---|---|---|---|
| 5,920,424 A | * | 7/1999 | Espindola et al. | 359/337.21 |
| 5,982,791 A | * | 11/1999 | Sorin et al. | 372/25 |
| 6,603,585 B2 | * | 8/2003 | Manna et al. | 398/158 |
| 6,636,666 B2 | * | 10/2003 | Chan et al. | 385/37 |
| 2004/0109638 A1 | * | 6/2004 | Shigehara et al. | 385/27 |

FOREIGN PATENT DOCUMENTS

JP    P2002-82235 A    3/2002    .............. 385/37 Y

OTHER PUBLICATIONS

"Long–Period Fiber Gratings as Band–Rejection Filters", Vengsarkar et al., IEEE, Journal of Lightwave Technology, pp. 58–65 vol. 14, No. 1, Jan. 1996.
"36 NM Amplifier Gain Equalizer Based on Slanted Bragg Grating Technology For Multichannel Transmission", Riant et al., Suboptic 2001, P4.3.10.

* cited by examiner

Primary Examiner—Brian M. Healy
(74) Attorney, Agent, or Firm—McDermott Will & Emery LLP

(57) ABSTRACT

The present invention is directed to a gain equalizer having a preferable equalization characteristic and a structure that can be easily fabricated. The gain equalizer flattens a spectrum of light in a predetermined wavelength range inputted through an input terminal and outputs the light from an output terminal, and comprises a coarse-tunable equalizing section and a fine-tunable equalizing section connected in series. The coarse-tunable equalizing section coarsely flattens the spectrum of the light in the predetermined wavelength range, and includes a plurality of filters each having a large loss and a small reflectance as compared with the fine-tunable equalizing section. The fine-tunable equalizing section flattens the spectrum of the light in a wavelength range where the coarse-tunable equalizing section can not flatten at a predetermined value or less among the predetermined wavelength range.

8 Claims, 7 Drawing Sheets

| BANDWIDTH OF SIGNAL LIGHT | MINIMUM BANDWIDTH | |
|---|---|---|
| | 10.0nm | 6.0nm |
| 40nm | 0.12dB | 0.06dB |
| 30nm | 0.05dB | 0.02dB |

GAIN EQUALIZER AND OPTICAL AMPLIFICATION APPARATUS

BACKGROUND OF THE INVENTION

1. Field of the Invention

The present invention relates to a gain equalizer flattening a spectrum of input light in a predetermined wavelength range, and an optical amplification apparatus amplifying signal light in the predetermined wavelength range.

2. Related Background Art

An optical amplification apparatus amplifies signal light inputted through an input terminal and outputs the amplified signal light from an output terminal, and, for example, is used in a WDM (Wavelength Division Multiplexing) optical communication system. Such optical amplification apparatus is required to flatten an entire gain spectrum in a predetermined wavelength range. However, a gain spectrum of an optical amplification medium generally used in the optical amplification apparatus (for example, an Er-doped optical fiber) is not flat.

That is, the optical amplification apparatus comprises a gain equalizer having a loss spectrum with the same shape as the gain spectrum of this optical amplification medium, and flattens the entire gain spectrum synthesizing the gain spectrum of the optical amplification medium and the transmission spectrum of the gain equalizer, in the predetermined wavelength range. As this gain equalizer, the use of a gain equalizer including a long-period grating is described in Japanese Patent Application Laid-Open No. 2002-82235, and the use of again equalizer including a slanted grating is described in Ashish M. Vengsarkar, et al., "Long-Period Fiber Gratings as Band-Rejection Filters", Journal of Lightwave Technology, Vol. 14, No. 1, pp. 58–65 (1996), and Isabelle Riant, et al., "36 nm Amplifier Gain Equalizer Based on Slanted Bragg Grating Technology for Multichannel Transmission", Suboptic 2001, P4.3.10 (2001).

A transmission spectrum of a filter such as the long-period grating or the slanted grating has a shape as shown in FIG. 1. FIG. 1 shows transmission spectrums of a filter having a wide bandwidth (corresponding to filter A) and a filter having a narrow bandwidth (corresponding to filter B), respectively. As can be seen from this figure, in the transmission spectrum of the filter A, the bandwidth where a transmittance is −0.1 dB or less (hereinafter referred to as minimum bandwidth) is 10 nm. On the other hand, the transmission spectrum of the filter B has a minimum bandwidth with 6 nm. In general, the gain equalizer has a transmission spectrum with such shape is constituted by a plurality of filters connected in series and each having a different minimum transmittance, a different minimum transmittance wavelength and a different minimum bandwidth. FIG. 2 shows the target transmission spectrum $T_t$ of the gain equalizer and the actual transmission spectrum $T_a$ of the gain equalizer with which a plurality of filters are applied, and FIG. 3 shows an error between the target transmittance and the actual transmittance.

SUMMARY OF THE INVENTION

The inventors have studied conventional optical communication systems in detail and, and as a result, have found problems as follows. Namely, in the case of using a plurality of filters, an actual equalization characteristic of the gain equalizer depends on a minimum bandwidth of a filter to be used and a width of signal wavelength band to be equalized. FIG. 4 is a table showing residuals of gain equalization at the minimum bandwidths 10.0 nm, 6.0 nm when changing the bandwidths of signal light. In the case that the bandwidth of signal light is 40 nm, the gain equalization residual at the minimum bandwidth of 10 nm is 0.12 dB, and the gain equalization residual at the minimum bandwidth of 6 nm is 0.06 dB. Also, in the case that the bandwidth of signal light is 30 nm, the gain equalization residual at the minimum bandwidth of 10 nm is 0.05 dB, and the gain equalization residual at the minimum bandwidth of 6 nm is 0.02 dB. In this way, the gain equalization characteristic of the gain equalizer is so bad that the minimum bandwidth of the filter is wide. In order to realize a gain equalizer having a desirable gain equalization characteristic, It is preferable to use a filter having a narrow minimum bandwidth. However, on the other hand, it is difficult to produce a filter having a large maximum loss with highly precise when a minimum bandwidth of the filter is narrow.

The present invention has been accomplished in order to solve the problem as discussed above and an object of the invention is to provide a gain equalizer having a preferable equalization characteristic and a structure that can be easily fabricated, and an optical amplification apparatus including the gain equalizer.

A gain equalizer according to the present invention flattens a spectrum of input light in a predetermined wavelength range, and comprises a coarse-tunable equalizing section and a fine-tunable equalizing section. The coarse-tunable section coarsely flattens the spectrum of input light in the predetermined wavelength range. The fine-tunable equalizing section flattens the spectrum of input light in a wavelength range where the coarse-tunable equalizing section can not flatten at a predetermined value or less among the predetermined wavelength range. Specifically, the coarse-tunable equalizing section has a loss larger than that of the fine-tunable equalizing section and a reflectance smaller than that of the fine-tunable equalizing section.

In the gain equalizer, the spectrum of input light is coarsely flattened by the coarse-tunable equalizing section in the predetermined wavelength range and is further fattened by the fine-tunable equalizing section in a wavelength range where the coarse-tunable equalizing section can not flatten the spectrum at the predetermined value or less, and thereby a desirable equalization characteristic can be obtained. And, since a filter having a larger loss and a smaller reflectance as compared with the fine-tunable equalizing section constitutes the coarse-tunable equalizing section, the gain equalizer can be easily fabricated so as to have a desirable equalization characteristic.

In the gain equalizer according to the present invention, it is preferable that a period of residual at the time of flattening of the coarse-tunable equalizing section in the predetermined wavelength range is wider than a bandwidth where the transmittance of the fine-tunable equalizing section is −0.1 dB or less. In this case, the gain equalizer can have a further desirable equalization characteristic.

In the gain equalizer according to the present invention, it is preferable that a period of residual at the time of flattening of the coarse-tunable equalizing section in the predetermined wavelength range is wider than a bandwidth where the transmittance of the fine-tunable equalizing section is −0.1 dB or less. In this case, the gain equalizer can have a further desirable equalization characteristic.

In the gain equalizer according to the present invention, it is preferable that the coarse-tunable equalizing section includes one of a long-period grating, a slanted grating, a dielectric multi-layer filter and an etalon filter. Also, the fine-tunable equalizing section is preferably includes one of a slanted grating and a chirped grating.

An optical amplification apparatus according to the present invention amplifies signal light in a predetermined wavelength range inputted through an input terminal and outputs the amplified signal light from an output terminal, and comprises an optical amplifier and a gain equalizer having the above-mentioned structure (gain equalizer according to the present invention). The optical amplifier amplifies the signal light in the predetermined wavelength range. The gain equalizer flattens the spectrum of signal light amplified by the optical amplifier in the predetermined wavelength range.

In the optical amplification apparatus, the signal light in the predetermined wavelength range is amplified by the optical amplifier, and the spectrum of the amplified signal light is flattened by the gain equalizer in the predetermined wavelength range. A total gain spectrum of the optical amplification apparatus is synthesized with a gain spectrum of the optical amplifier and a transmission spectrum of the gain equalizer, and thereby a superior flatness can be obtained in the predetermined wavelength range.

It is preferable that the optical amplification apparatus further comprises an optical isolator, which passes light therethrough only in a forward direction from the input terminal to the output terminal, arranged between the optical amplifier and the gain equalizer. At this time, it is preferable that the optical amplifier, the optical isolator, the fine-tunable equalizing section and the coarse-tunable equalizing section are arranged in the order from the input terminal to the output terminal. Also, in the optical amplification apparatus, the optical amplifier, the coarse-tunable equalizing section and the fine-tunable equalizing section are arranged in the order from the input terminal to the output terminal, and it is preferable that the isolator, which passes light therethrough only in the forward direction from the input terminal to the output terminal.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Embodiments of the gain equalizer and the optical amplification apparatus according to the present invention will be described below in detail with reference to FIGS. 5–12. The same components or same parts will be denoted by the same reference symbols throughout the description of the drawings, without redundant description thereof.

Figure 1:
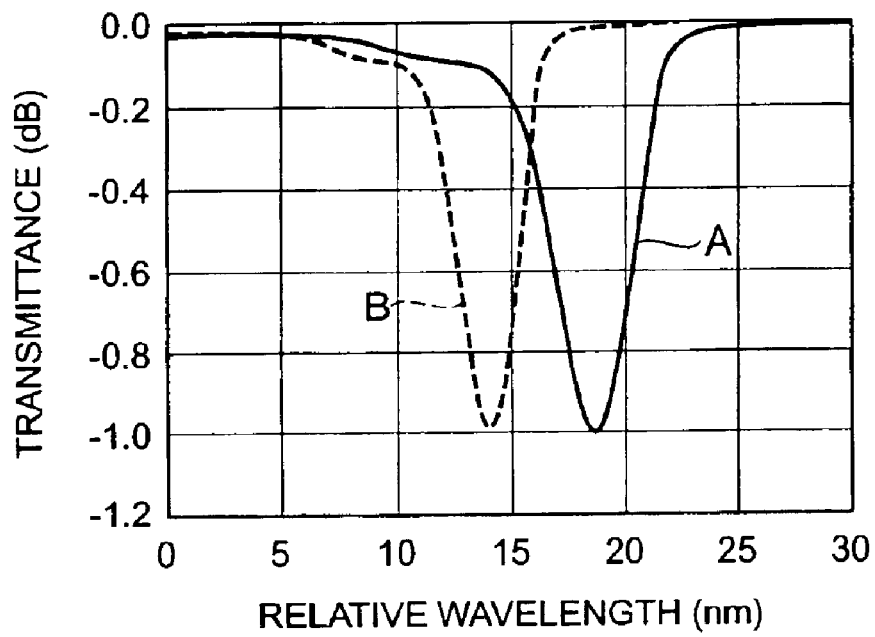
FIG. 1 is a view showing graphs of transmission spectrum of two kinds of filters.
Figure 2:
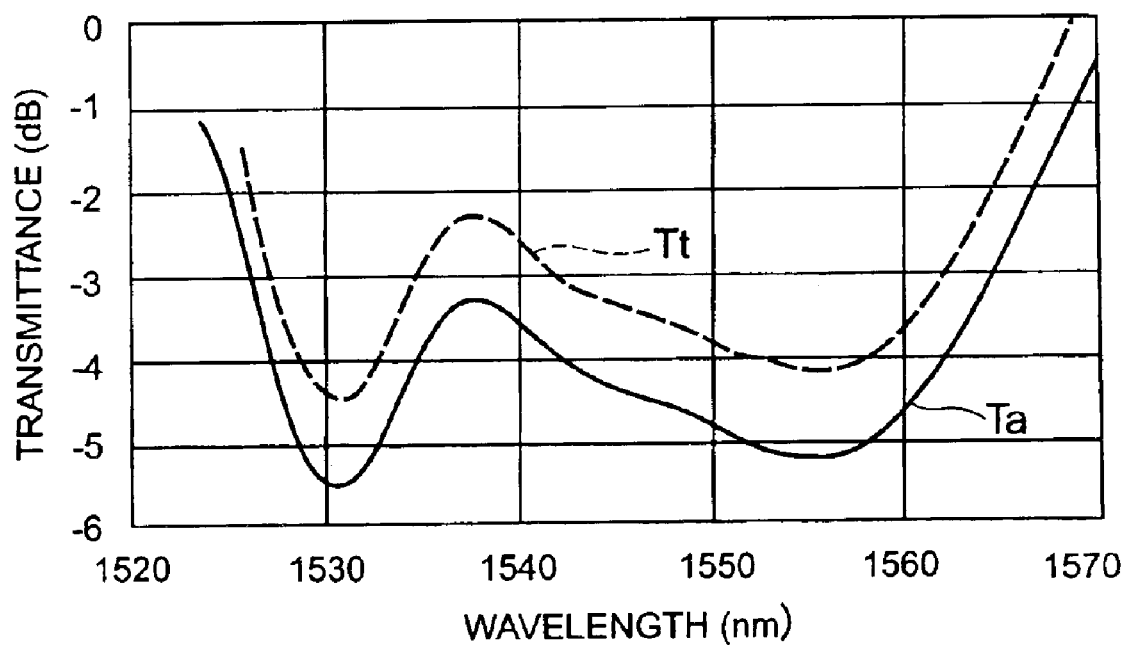
FIG. 2 is a view showing a target transmission spectrum of a gain equalizer and an actual transmission spectrum of a gain equalizer with which a plurality of filters are applied.
Figures 3, 4:
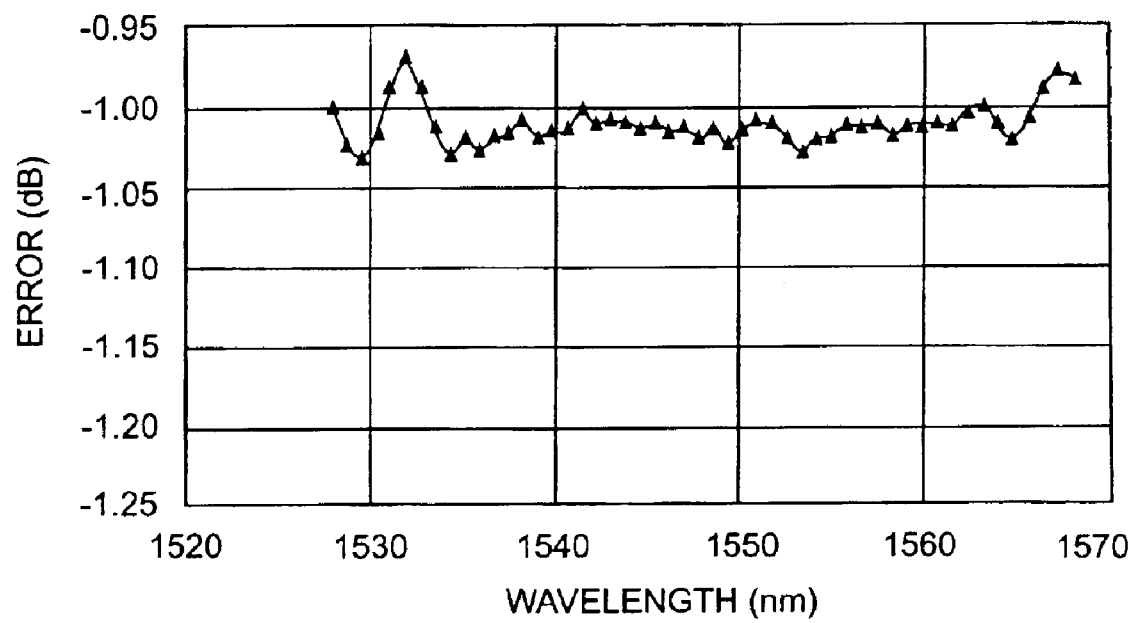
FIG. 3 is a graph showing an error between the target transmittance and the actual transmittance.
FIG. 4 is a table showing residuals of gain equalization at the minimum bandwidths 10.0 nm, 6.0 nm when changing the bandwidths of signal light.
Figure 5:
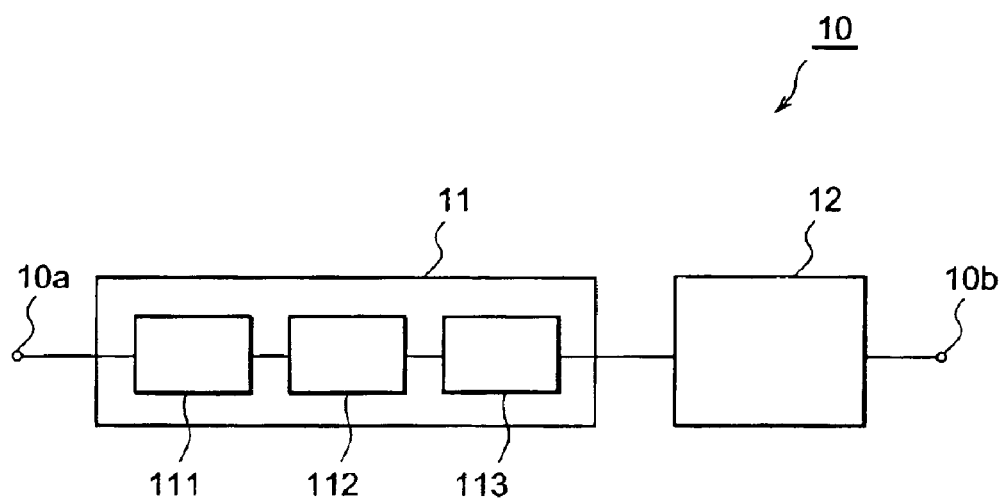
FIG. 5 is a diagram showing a construction of a gain equalizer according to the present invention.

FIG. 5 is a diagram showing a construction of a gain equalizer according to the present invention. As shown in this figure, the gain equalizer 10 flattens a spectrum of light inputted through an input terminal 10a over a predetermined wavelength range and outputs the light form an output terminal 10b. The gain equalizer 10 comprises a coarse-tunable equalizing section 11 and a fine-tunable equalizing section 12 connected in series between the input terminal 10a and the output terminal 10b. As for the coarse-tunable equalizing section 11 and the fine-tunable equalizing section 12, any may be arranged at the forward stage.

The coarse-tunable equalizing section 11 coarsely flattens the spectrum of light in the predetermined wavelength range. The coarse-tunable equalizing section 11 is constituted by filters 11 to 113 each having a larger loss and a smaller reflectance as compared with the fine-tunable equalizing section 12. By this, the light reflection can be suppressed in the whole gain equalizer 10. Also, each of filter 11 to 113 included in the coarse-tunable equalizing section 11 preferably includes one of a long-period grating, a slanted grating, a dielectric multi-layer filter and an etalon filter.

The fine-tunable equalizing section 12 further flattens the spectrum of light in a wavelength range where the coarse-tunable equalizing section can not flatten at a predetermined value or less among the predetermined wavelength range. The fine-tunable equalizing section 12 preferably includes one of a slanted grating and a chirped grating.

Also, in the predetermined wavelength range, the period of residual at the time of flattening of the coarse-tunable equalizing section 11 is preferably wider than a minimum bandwidth of the fine-tunable equalizing section 12. In this way, the further flattening of the fine-tunable equalizing section 12 to the light spectrum becomes easy.

Figure 6:
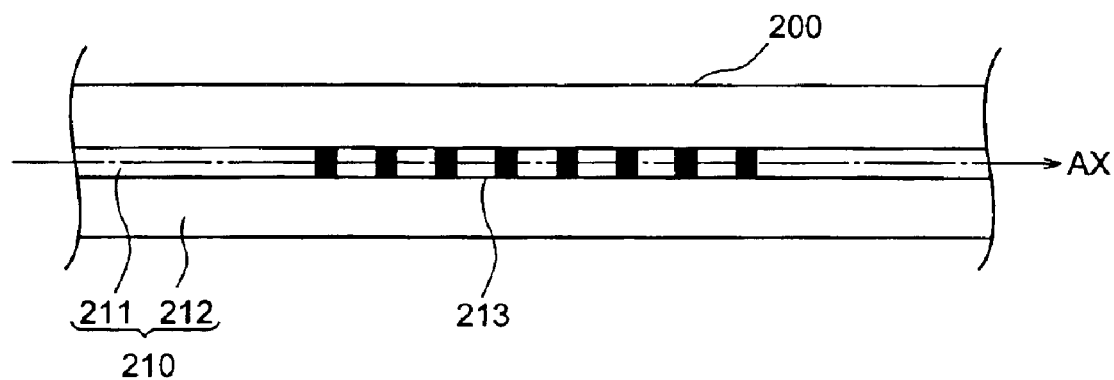
FIG. 6 is a cross-sectional view of a long-period grating.

FIG. 6 is a cross-sectional view of the long-period grating. The long-period grating 200 shown in FIG. 6 can be preferably applied to the filter included to the coarse-tunable equalizing section. The long-period grating 200 comprises an optical fiber 210 and grating patterns 213 formed by refractive index modulation along a longitudinal direction of the optical fiber 210. The optical fiber 210 has a core region 211 extending along an optical axis AX and a cladding region 212 surrounding the periphery of the core region 211.

The grating patterns 213 are arranged in a predetermined region of the core region 211 along the longitudinal direction of the optical fiber 210. In the long-period grating 200, the grating patterns 213 have a long pattern spacing of several hundreds μm, and thereby the grating patterns 213, among the propagation mode light that has propagated through the core region 211 and has reached the grating patterns 213, grant a loss to light having a wavelength satisfying a phase matching condition between a cladding mode light.

Figure 7:
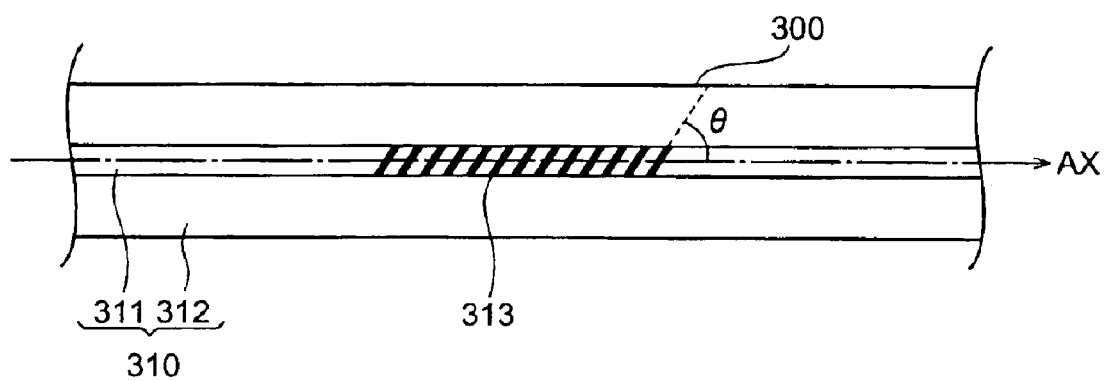
FIG. 7 is a cross-sectional view of a slanted grating.

FIG. 7 is a cross-sectional view of a slanted grating. The slanted grating 300 shown in FIG. 7 can be preferably applied to the filter included in the coarse-tunable equalizing section 11 or the fine-tunable equalizing section 12. The slanted grating 300 comprises an optical fiber 310 and grating patterns 313 formed by refractive index modulation along a longitudinal direction of the optical fiber 310. The optical fiber 310 has a core region 311 extending along an optical axis AX and a cladding region 312 surrounding the periphery of the core region 311. The grating patterns 313 are arranged in a predetermined region of the core region 311 along the longitudinal direction of the optical fiber 310. In the slanted grating 300, the grating patterns 313 have a narrow pattern spacing, and has grating surfaces tilted with respect to the optical axis AX of optical fiber 310 at an angle of θ. In the slanted grating 300, the grating patterns 313, among the propagation mode light that has propagated through the core region 311 and has reached the grating patterns 313, grant a loss to light of a short wavelength side from a wavelength satisfying a Bragg condition in the grating patterns 313.

Figure 8:
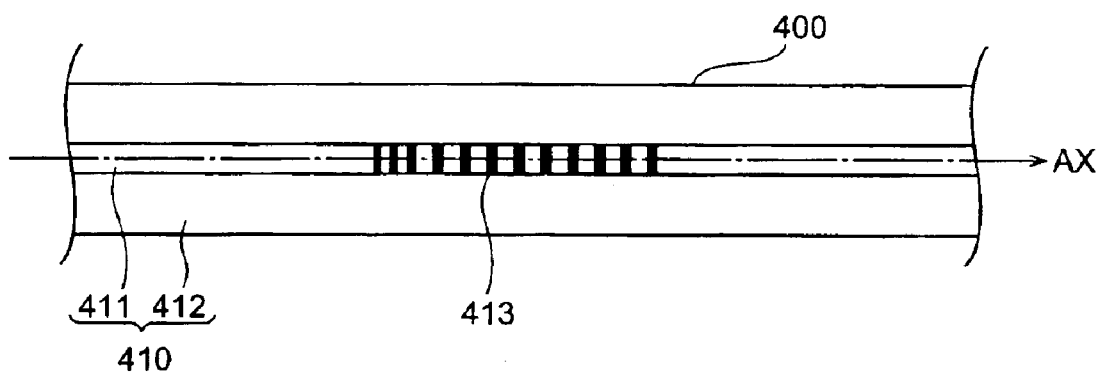
FIG. 8 is a cross-sectional view of a chirped grating.

FIG. 8 is a cross-sectional view of a chirped grating. The chirped grating 400 shown in FIG. 8 can be preferably applied to the filter included in the fine-tunable equalizing section 12. The chirped grating 400 comprises an optical fiber 410 and grating patterns 413 formed by refractive index modulation along a longitudinal direction of the optical fiber 410. The optical fiber 410 has a core region 411 extending along an optical axis AX and a cladding region 412 surrounding the periphery of the core region 411. The grating patterns 413 are arranged in a predetermined region of the core region 411 along the longitudinal direction of the optical fiber 410. In the chirped grating 400, the grating patterns 413 have a narrow pattern spacing, and the pattern spacing of the grating patterns 413 changes along a longitudinal direction of the optical fiber 410. In the chirped grating 400, the grating patterns 413, among the propagation mode light that has propagated through the core region 411 and has reached the grating patterns 413, grant a loss to light having a wavelength satisfying a Bragg condition at each position in the longitudinal direction of the grating patterns 413.

Figure 9:
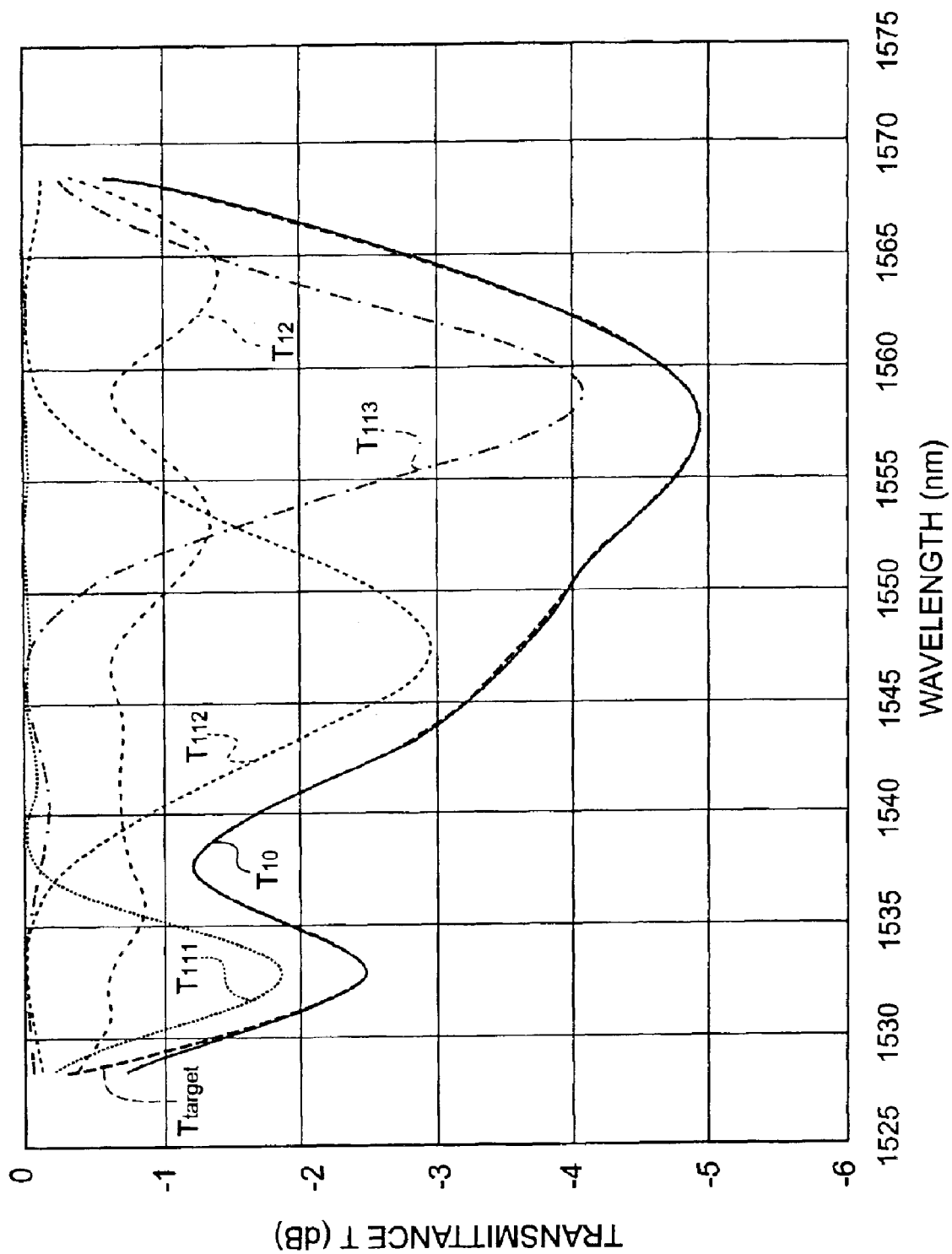
FIG. 9 is a view showing transmission-spectra of the gain equalizer according to the present invention.
Figure 10:
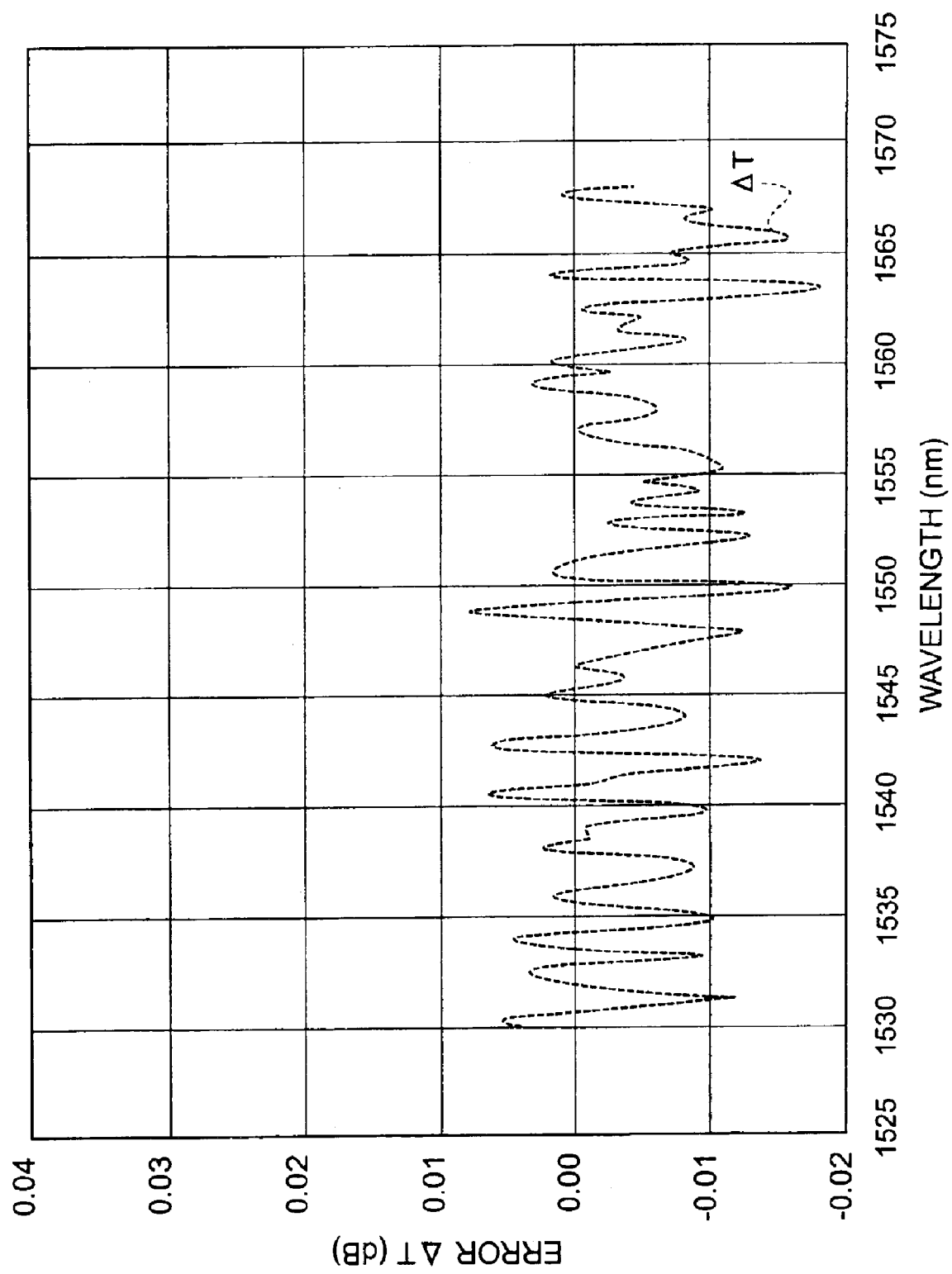
FIG. 10 is a view showing an error between the actual transmittance and the target transmittance of the whole gain equalizer according to the present invention.

FIG. 9 is a view showing transmission spectra of the gain equalizer 10 according to the present invention. In this figure, the spectrum $T_{111}$ indicates a transmittance of the filter 111, the spectrum $T_{112}$ indicates a transmittance of the filter 112, the spectrum $T_{113}$ indicates a transmittance of the filter 113, the spectrum $T_{12}$ indicates a transmittance of the fine-tunable equalizing section 12, the spectrum $T_{10}$ indicates an actual transmittance of the whole gain equalizer 10, and the spectrum $T_{target}$ indicates a target transmittance of the whole gain equalizer 10, respectively. Further, FIG. 10 is a view showing a spectrum $\Delta T (=T_{target}-T_{10})$ corresponding to the error between the target transmittance and the actual transmittance of the whole gain equalizer 10. Here, each of the filters 11 to 113 included in the coarse-tunable equalizing section 11 is a long-period grating, and the fine-tunable equalizing section 12 is a slanted grating. As can be seen from these figures, in the C-band (1530 nm–1565 nm), the error $\Delta T$ falls into the range of –0.02 dB to +0.1 dB, and the actual transmittance $T_{10}$ of the whole gain equalizer 10 is well coincident with the target transmittance $T_{target}$.

The gain equalizer 10 according to the present invention can flatten the light spectrum with a sufficient accuracy even though a granted loss is large, and a filter with a wider minimum bandwidth can also be used as a filter in the coarse-tunable equalizing section 11. Since the wavelength range where the coarse-tunable equalizing section 11 cannot flatten at a predetermined value or less is further flattened by the fine-tunable equalizing section 12, the equalization accuracy of the coarse-tunable equalizing section 11 does not need to be high. By this reason, the gain equalizer 10 can be easily fabricated and a fabrication cost becomes low. An equalization accuracy improves by using a filter with a narrow bandwidth rather than granting a large loss by the filter. Also, since each of the slanted grating and the chirped grating has a narrower bandwidth and a larger reflectance as compare with other types of filters, the reflectance of the whole gain equalizer 10 becomes low by using these grating as the fine-tunable equalizing section 12.

Figure 11:
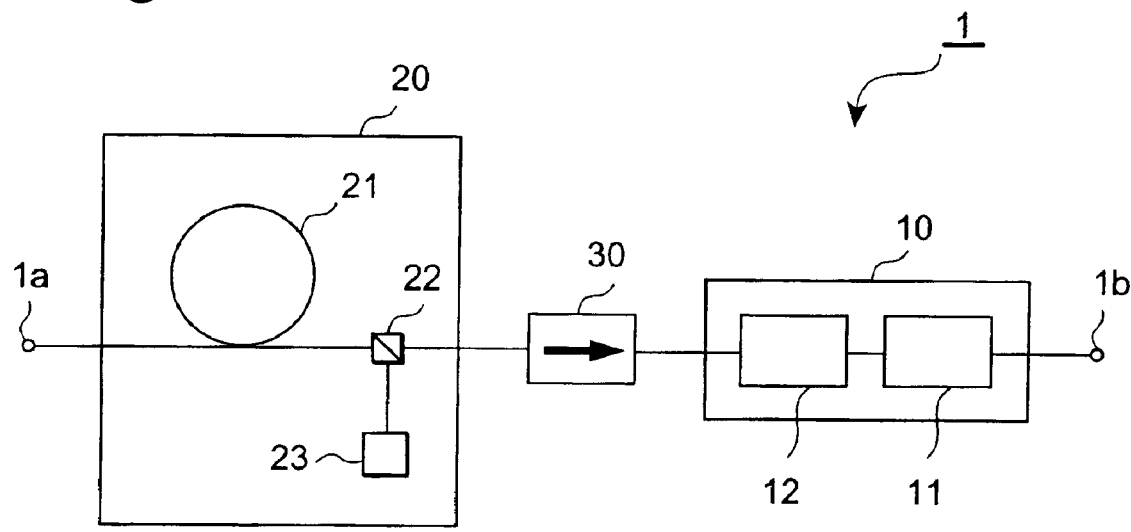
FIG. 11 is a diagram showing a construction of an optical amplification apparatus of a first embodiment according to the present invention.

FIG. 11 is a diagram showing an optical amplification apparatus of a first embodiment according to the present invention. The optical amplification apparatus 1 as shown in FIG. 11 amplifies signal light in a predetermined wavelength range inputted through an input terminal 1a and outputs the amplified signal light from an output terminal 1b, The optical amplification apparatus 1 comprises an optical amplifier 20, an optical isolator 30, a fine-tunable equalizing section 12 and a coarse-tunable equalizing section 11, which are arranged in order from the input terminal 1a to the output terminal 1b. The fine-tunable equalizing section 12 and the coarse-tunable equalizing section 11 are respectively included in the gain equalizer 10 according to the present invention.

The optical amplifier 20 amplifies the signal light in the predetermined wavelength range inputted through the input terminal 1a and outputs the amplified signal light to the optical isolator 30. The optical amplifier 20 has an optical amplification fiber 21, an optical coupler 22 and a pumping light source 23. The optical amplification fiber 21 is an optical fiber whose core is added with a rare-earth element (for example, Er element), and amplifies the signal light in the predetermined wavelength range by supplying a pumping light with a wavelength capable of pumping the rear-earth element thereto. The pumping light source 23 outputs the pumping light to be supplied to the optical amplification fiber 21. The optical coupler 22 outputs the pumping light outputted from the pumping light source 23 to the optical amplification fiber 21, and outputs the signal light amplified by the optical amplification fiber 21 to the optical isolator 30. In the case that the optical amplification fiber 21 is an Er-doped optical fiber, the wavelength of the pumping light is 0.98 μm or 1.48 μm, and the signal wavelength band to be amplified is C-band.

The optical isolator 30 is provided between the optical amplifier 20 and the gain equalizer 10. The optical isolator 30 passes light only in a forward direction from the input terminal 1a to the output terminal 1b, but it does not pass light in a backward direction. The gain equalizer 10 has the structure as described above. The gain equalizer 10 flattens the signal light, passing through the optical isolator 30 after the amplification of the optical amplifier 20, in the predetermined wavelength range, and outputs the signal light from the output terminal 1b.

In the optical amplification apparatus, the signal light in the predetermined wavelength inputted through the input terminal 1a is amplified in the optical amplification fiber 21, and thereafter is gain-flattened by the gain equalizer 10. The gain spectrum of the whole optical amplification apparatus 1 is obtained by synthesizing the gain spectrum of the optical amplifier 20 and the transmission spectrum of the gain equalizer 10. The loss spectrum of the gain equalizer 10 and the transmission spectrum of each filter are designed for the purpose of the gain spectrum of the optical amplifier 20. That is, the gain spectrum of the whole optical amplification apparatus 1 can be flattened in the predetermined wavelength range.

At the case that part of light inputted to the gain equalizer 10 from the optical isolator 30 may be reflected by the gain equalizer 10, the reflected light as the part propagates from the gain equalizer 10 to the optical isolator 30. If the optical isolator 30 is not provided, the reflected light is inputted into and amplified by the optical amplifier 20. As a result, the amplified reflected light further propagates toward an upstream, and has a bad influence on the transmission quality of signal light. However, the first embodiment of the optical amplification apparatus 1 in which the optical isolator 30 is provided can prevent that the reflected light carries out incidence to the optical amplifier 20 after passing through the optical isolator 30, and therefore the transmission quality of signal light can not have a bad influence on the transmission quality of signal light In addition, like the first embodiment, it is preferable that the fine-tunable equalizing section 12 having a comparatively large reflectance is arranged at the forward stage and the coarse-tunable equalizing section 11 is arranged at the backward stage in the gain equalizer 10. In this way, by placing the coarse-tunable equalizing section 11 having a comparative small reflectance immediately after the optical isolator 30, noise components, which are generated by the gain equalizer 10 re-reflecting the reflected light due to Rayleigh scattering at the downstream to the downstream, can be reduced. Because the influence of reflection of the fine-tunable equalizing section 11 can be reduced by the reflected light passing through the coarse-tunable equalizing section 11 twice.

Figure 12:
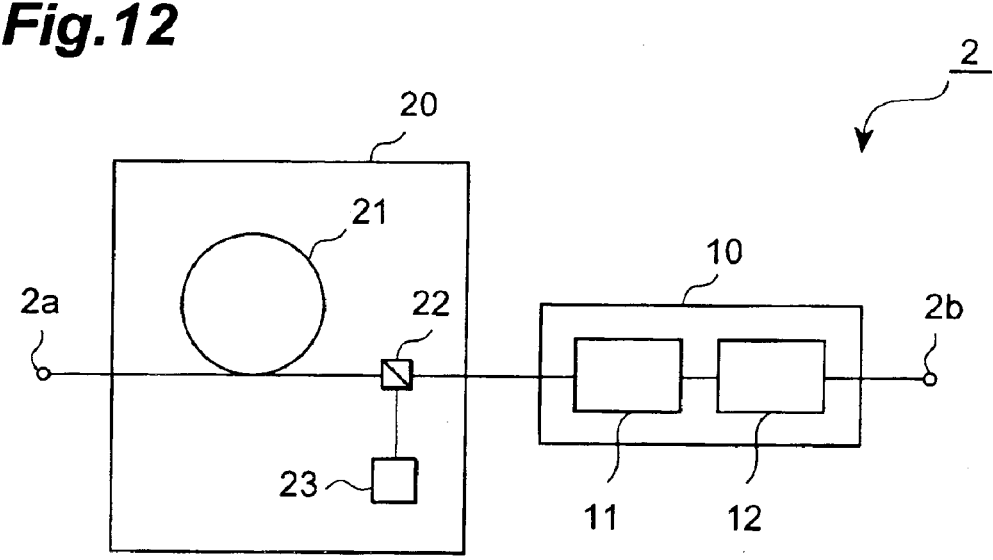
FIG. 12 is a diagram showing a construction of an optical amplification apparatus of a second embodiment according to the present invention.

FIG. 12 is a diagram showing a structure of an optical amplification apparatus of a second embodiment according to the present invention. The optical amplification apparatus 2 shown in FIG. 12 amplifies signal light in a predetermined wavelength range inputted through an input terminal 2a and the amplified signal light from an output terminal 2b. The optical amplification apparatus 2 comprises an optical amplifier 20, a coarse-tunable equalizing section 11 and a fine-tunable equalizing section 12, which are arranged in the order from the input terminal 2a to the output terminal 2b. The coarse-tunable equalizing section 11 and the fine-tunable equalizing section 12 are included in the gain equalizer 10 according to the present invention.

As compared with the optical amplification apparatus 1 according to the first embodiment, the optical amplification apparatus 2 according to the second embodiment is different from each other at the point which an optical isolator is not provided between the optical amplifier 20 and the gain equalizer 10 and the point which the coarse-tunable equalizing section 11 is provided at the forward stage and the fine-tunable equalizing section 12 is provided at the backward stage in the gain equalizer 10. The optical amplification apparatus 2 is cheap because an optical isolator is not necessary.

In the optical amplification apparatus 2, the signal light in the predetermined wavelength range inputted through the input terminal 2a is gain-equalized by the gain equalizer 10 after amplification of the optical amplification fiber 21. The gain spectrum of the whole optical amplification apparatus 2 is obtained by synthesizing the gain spectrum of the optical amplifier 20 and the transmission spectrum of the gain equalizer 10. The loss spectrum of the gain equalizer 10 and the transmission spectrum of each filter are designed for the purpose of the gain spectrum of the optical amplifier 20. That is, the gain spectrum of the whole optical amplification apparatus 2 can be flattened in the predetermined wavelength range.

At the case that part of light inputted to the gain equalizer 10 may be reflected by the coarse-tunable equalizing section 11 and the fine-tunable equalizing section 12, the reflected light as the part propagates toward the upstream. However, in the second embodiment, though an optical isolator is not provided between the optical amplifier 20 and the gain equalizer 10, the coarse-tunable equalizing section 11 having a comparative small reflectance is provided at the forward stage and the fine-tunable equalizing section 12 having a comparative large reflectance is provided at the backward stage in the gain equalizer 10. By this structure, the reflected light due to the fine-tunable equalizing section 12 is granted with a loss by the coarse-tunable equalizing section 11. As a result, the incidence of reflected light from the optical amplifier 20 is reduced, and the degradation on the transmission quality of signal light is reduced. This construction is important to apply to a low-cost system rather than the reducing the influence of reflection toward the downstream.

As described above, the gain equalizer according to the present invention coarsely flattens a spectrum of input light in the predetermined wavelength range by the coarse-tunable equalizing section and further flattens the spectrum in a wavelength range where the coarse-tunable equalizing section can not flatten under the predetermined value among the predetermined wavelength range. By this, a desirable equalization characteristic can be obtained. And, since the coarse-tunable equalizing section has a larger loss and a smaller reflectance as compared with the fine-tunable equalizing section, a gain equalizer having a desirable equalization characteristic can be easily fabricated.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A gain equalizer for flattening a spectrum of input light in a predetermined wavelength range, comprising:
    a coarse-tunable equalizing section flattening the spectrum of input light in the predetermined wavelength range; and
    a fine-tunable equalizing section flattening the spectrum of input light in a wavelength range where said coarse-tunable equalizing section can not flatten at a predetermined value or less among the predetermined wavelength range,
    wherein said coarse-tunable equalizing section has a loss larger than that of said fine-tunable equalizing section and a reflectance smaller than that of said fine-tunable equalizing section.

2. A gain equalizer according to claim 1, wherein a period of residual when flattened by said coarse-tunable equalizing section in the predetermined wavelength range is broader than a band width where a transmittance of said fine-tunable equalizing section becomes −0.1 dB or less.

3. A gain equalizer according to claim 1, wherein said coarse-tunable equalizing section includes one of a long-period grating, a slanted grating, a dielectric multi-layer filter and an etalon filter.

4. A gain equalizer according to claim 1, wherein said fine-tunable equalizing section includes one of a slanted grating and a chirped grating.

5. An optical amplification apparatus for amplifying signal light in a predetermined wavelength range inputted through an input terminal and outputting the amplified signal light from an output terminal, comprising:

an optical amplifier amplifying the signal light in the predetermined wavelength range; and a gain equalizer according to claim 1, said gain equalizer flattening a spectrum of the signal light amplified by said optical amplifier in the predetermined wavelength range.

6. An optical amplification apparatus according to claim 5, further comprising an optical isolator arranged between said optical amplifier and said gain equalizer, said optical isolator passing light therethrough only in a forward direction from said input terminal to said output terminal.

7. An amplification apparatus according to claim 5, wherein, in the order from said input terminal to said output terminal, said optical amplifier, said optical isolator, said fine-tunable equalizing section and said coarse-tunable equalizing section are arranged.

8. An optical amplification apparatus according to claim 5, wherein, in the order from said input terminal to said output terminal, said optical amplifier, said coarse-tunable equalizing section and said fine-tunable equalizing section, and wherein an optical isolator, which passes light therethrough only in a forward direction from said input terminal to said output terminal, is not arranged between said optical amplifier and said gain equalizer.

* * * * *